US009440602B2

(12) United States Patent
Iwanaga et al.

(10) Patent No.: US 9,440,602 B2
(45) Date of Patent: *Sep. 13, 2016

(54) METHOD OF OPERATING AN IN-VEHICLE CHARGER, AND AN IN-VEHICLE CHARGER MOUNTED TO A VEHICLE

(71) Applicant: Panasonic Intellectual Property Management Co., Ltd., Osaka (JP)

(72) Inventors: Izumi Iwanaga, Kanagawa (JP); Kenichi Koike, Kanagawa (JP); Taro Katayama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/015,593

(22) Filed: Feb. 4, 2016

(65) Prior Publication Data

US 2016/0152199 A1 Jun. 2, 2016

Related U.S. Application Data

(63) Continuation of application No. 14/003,545, filed as application No. PCT/JP2012/001536 on Mar. 6, 2012, now Pat. No. 9,266,483.

(30) Foreign Application Priority Data

Mar. 7, 2011 (JP) ................. 2011-048701

(51) Int. Cl.
*B60R 16/03* (2006.01)
*H02J 7/02* (2016.01)
(Continued)

(52) U.S. Cl.
CPC .............. *B60R 16/03* (2013.01); *B60L 11/182* (2013.01); *B60R 25/406* (2013.01); *H02J 7/025* (2013.01);
(Continued)

(58) Field of Classification Search
CPC .......... B60R 16/03; H02J 7/025; H02J 7/163
See application file for complete search history.

(56) References Cited

U.S. PATENT DOCUMENTS 5,912,631 A 6/1999 Kusunoki
8,102,249 B2 1/2012 Sakamoto et al.
(Continued)

FOREIGN PATENT DOCUMENTS

EP 2 672 608 12/2013
EP 2672608 A1 * 12/2013 ............ H01M 10/46
(Continued)

OTHER PUBLICATIONS

International Search Report issued Jun. 12, 2012 in International Application No. PCT/JP2012/001536.
(Continued)

*Primary Examiner* — Jelani Smith
*Assistant Examiner* — Kelly D Williams
(74) *Attorney, Agent, or Firm* — Wenderoth, Lind & Ponack, L.L.P.

(57) ABSTRACT

A method for operating an in-vehicle charger and an in-vehicle charger mounted to a vehicle. The in-vehicle charger includes a charging coil for performing non-contact charging to a mobile device placed in the vehicle; and a control unit connected to the charging coil. The control unit instructs start or stop of supplying power to the charging coil in response to detecting a first signal indicating the engine is driven and a second signal indicating a state of a vehicle component of the vehicle other than the engine. The method includes a step of detecting the first signal; a step of detecting the second signal; and a step of instructing a start or stop of supplying power to the charging coil in response to detecting both of the first and second signals.

12 Claims, 3 Drawing Sheets

(51) Int. Cl.
 *B60R 25/40* (2013.01)
 *B60L 11/18* (2006.01)
 *H02J 7/16* (2006.01)

(52) U.S. Cl.
 CPC ............ *H02J 7/163* (2013.01); *Y02T 10/7005* (2013.01); *Y02T 10/7072* (2013.01); *Y02T 90/122* (2013.01); *Y02T 90/14* (2013.01); *Y02T 90/16* (2013.01)

(56) References Cited

U.S. PATENT DOCUMENTS

| | | | |
|---|---|---|---|
| 8,386,090 | B1 | 2/2013 | Hobbs et al. |
| 8,534,253 | B2* | 9/2013 | Matsubara ............... B60R 25/00 123/179.2 |
| 2002/0158512 | A1 | 10/2002 | Mizutani et al. |
| 2004/0093127 | A1* | 5/2004 | Onoyama ............... B60R 25/00 701/1 |
| 2007/0279002 | A1 | 12/2007 | Partovi |
| 2008/0169898 | A1* | 7/2008 | Kato ................... B60R 25/24 340/5.1 |
| 2009/0045773 | A1* | 2/2009 | Pandya ................ B60L 5/005 320/108 |
| 2010/0231349 | A1* | 9/2010 | Tanaka ................ B60R 25/24 340/5.2 |
| 2011/0291822 | A1* | 12/2011 | Boston ................. B60Q 1/503 340/425.5 |
| 2012/0200151 | A1* | 8/2012 | Obayashi ............. B60L 11/123 307/9.1 |
| 2012/0299538 | A1* | 11/2012 | Arai .................... B60L 11/182 320/108 |
| 2013/0110318 | A1* | 5/2013 | Colja ..................... H02J 7/042 701/2 |
| 2013/0147426 | A1* | 6/2013 | Misono ................. B60R 16/03 320/108 |
| 2013/0300204 | A1* | 11/2013 | Partovi ................. H01F 38/14 307/104 |
| 2013/0307474 | A1* | 11/2013 | Shimura .............. H01M 10/46 320/108 |
| 2014/0103865 | A1* | 4/2014 | Van Wiemeersch .... H02J 17/00 320/108 |
| 2014/0114539 | A1* | 4/2014 | Ando .................... F02D 35/00 701/51 |
| 2014/0217816 | A1* | 8/2014 | Okada .................. H02J 7/025 307/10.1 |

FOREIGN PATENT DOCUMENTS

| | | |
|---|---|---|
| GB | 2 372 534 | 8/2002 |
| JP | 4-317527 | 11/1992 |
| JP | 8-130803 | 5/1996 |
| JP | 9-37475 | 2/1997 |
| JP | 2003-11734 | 1/2003 |
| JP | 2009-148108 | 7/2009 |
| JP | 2010-36871 | 2/2010 |
| JP | 2010-036871 | 2/2010 |

OTHER PUBLICATIONS

Extended European Search Report issued Jul. 14, 2014 in corresponding European patent application No. 12 75 5734.

* cited by examiner

METHOD OF OPERATING AN IN-VEHICLE CHARGER, AND AN IN-VEHICLE CHARGER MOUNTED TO A VEHICLE

This application is a continuation of application Ser. No. 14/003,545, which is the National Stage of International Application No. PCT/JP2012/001536, filed Mar. 6, 2012.

BACKGROUND OF THE INVENTION

1. Technical Field

The present invention relates to an in-vehicle charger to be mounted to a vehicle and a program therefore.

2. Description of the Related Art

With the widespread use of mobile devices, an in-vehicle charger has been suggested which allows the mobile devices to be charged also in the vehicle (see JP-A-4-317527, for example).

Specifically, the in-vehicle charger includes a case whose one face is an opening, a lid which covers the opening of the case in an openable/closable manner and a charging coil which is disposed in an inner surface portion of the case opposite to the lid.

When the mobile device is charged using the in-vehicle charger, power is supplied by magnetic flux in such a way that the mobile device is accommodated in the case and the charging coil of the in-vehicle charger and a charging coil of the mobile device are placed to face each other.

SUMMARY OF THE INVENTION

1. Problems to be Solved by the Invention

In the related art above described, there is a possibility that the reliability of a vehicle control, for example, an open/close control of a door is decreased.

Specifically, the vehicles in recent years perform a so-called keyless entry control in order to open/close the door. In this keyless entry control, the opening/closing of the door is performed by the wireless communication between a remote control key and a transceiver of a vehicle.

In this case, when the mobile device is charged in the vehicle by the in-vehicle charger, electromagnetic waves emitted from a charging coil thereof affect the wireless communication between the remote control key and the transceiver of the vehicle. As a result, there is a possibility that the reliability of the open/close control of the door can be decreased.

Accordingly, an object of the present invention is to prevent a decrease in the reliability of a vehicle control.

2. Means for Solving the Problems

An in-vehicle charger of the invention includes a charging coil mounted to a vehicle including a communication device; and a control unit connected to the charging coil, and the control unit supplies power to the charging coil at the time of detecting a vehicle driving state.

Also, the invention provides a program for causing a computer to execute: a step of acquiring an engine operation state signal of a vehicle and a parking brake release signal of the vehicle, the vehicle including a communication device; a step of detecting a vehicle driving state based on the engine operation state signal and the parking brake release signal; and a step of instructing supply of power to a charging coil mounted to the vehicle at the time of detecting the vehicle driving state.

According to the configuration or the program described above, power is supplied to the charging coil in accordance with, for example, the detection of the engine operation state of the vehicle and whether the parking brake is pulled or not, at the time of detecting the vehicle driving state. Accordingly, in a state before driving the vehicle, that is, in a state where the door is opened/closed and boarding or exiting is performed, power is not supplied to the charging coil.

Accordingly, even when the wireless communication between the remote control key and the transceiver of the vehicle is performed in order to open/close the door, for example, the electromagnetic waves emitted from the charging coil do not affect the wireless communication. As a result, it is possible to prevent a decrease in the reliability of the open/close control of the door, etc., for example.

3. Advantageous Effects of the Invention

According to the present invention, it is possible to prevent a decrease in the reliability of a vehicle control.

DETAILED DESCRIPTION OF THE INVENTION

Hereinafter, an illustrative embodiment of the present invention will be described with reference to the drawings.

First Embodiment

Figure 1:
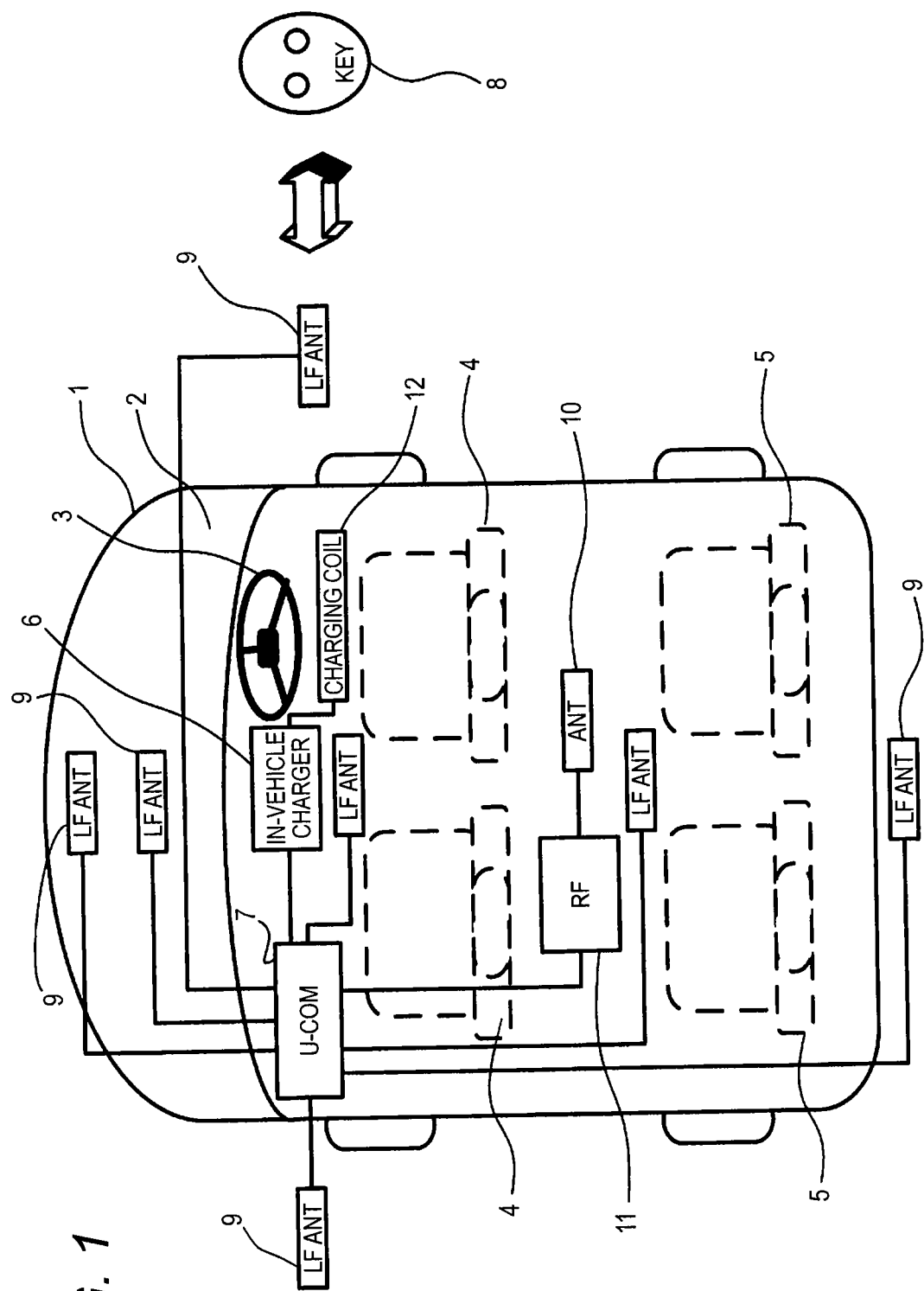
FIG. 1 is a view showing an in-vehicle charger according to a first embodiment of the present invention in the state of being mounted to a vehicle.

By referring to FIG. 1, a steering wheel 3 is arranged in the front of a vehicle interior 2 of a vehicle body 1 and front seats 4 and rear seats 5 are arranged in the rear of the steering wheel 3.

Further, an in-vehicle charger 6 is arranged on the left side of the steering wheel 3 in the vehicle interior 2.

The in-vehicle charger 6 is connected to a vehicle control device (U-COM) 7 to perform various controls for the vehicle, as shown in FIG. 1.

The vehicle control device 7 performs various controls for the vehicle as described above and is connected to antennas 9 and an antenna 10. The antennas 9 are provided on all sides of the vehicle body 1 and intended to transmit an output for opening/closing the door to a wireless key 8. The antenna 10 is intended to receive an output from the wireless key 8. The antennas 9, 10 are examples of a communication device.

Meanwhile, a RF circuit 11 is interposed between the antenna 10 and the vehicle control device 7.

Figure 2:
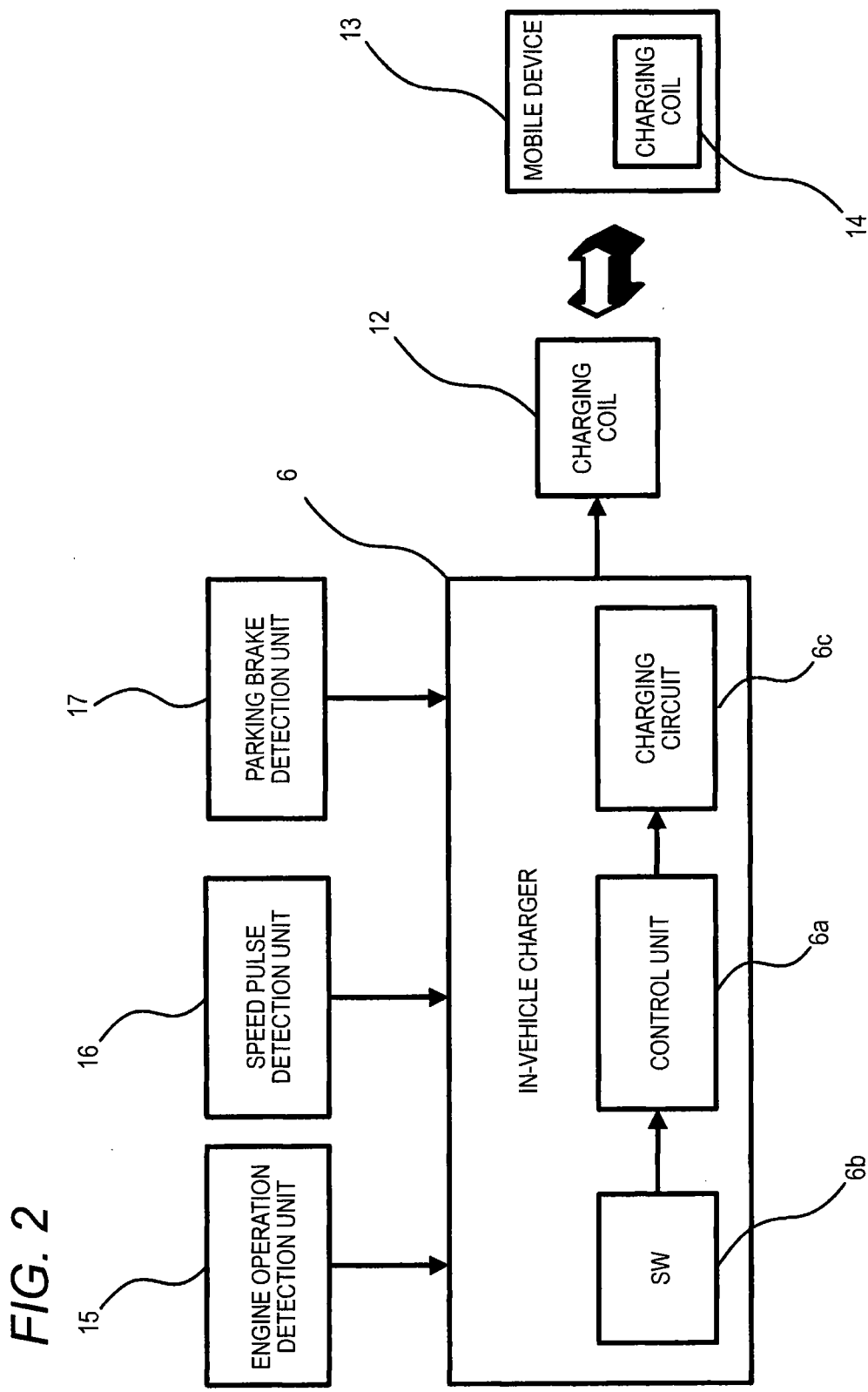
FIG. 2 is a control block diagram of the vehicle.

Further, as shown in FIG. 1, the in-vehicle charger 6 is connected to the vehicle control device 7. Further, as shown in FIG. 2, the in-vehicle charger 6 includes a charging coil 12 and a charging circuit 6c to drive the charging coil 12.

Furthermore, a control unit 6a is connected to the charging circuit 6c. As the charging coil 12 and a charging coil 14 of a mobile device 13 approach to face each other, the control unit 6a instructs the charging circuit 6c to start a non-contact charging.

That is, as magnetic flux is transmitted from the charging coil 12 of the vehicle body 1 toward the charging coil 14 of the mobile device 13, the non-contact charging of the mobile device 13 is performed.

In the present embodiment, as described above, the non-contact charging of the mobile device 13 is performed by the charging coil 12 of the vehicle body 1. At this time, the control unit 6a of the in-vehicle charger 6 is configured to receive a vehicle driving state detection signal from the vehicle control device 7.

Specifically, the control unit 6a is connected to an engine operation detection unit 15, a speed pulse detection unit 16 and a parking brake detection unit 17. The engine operation detection unit 15 is intended to detect the engine operation state of the vehicle. The speed pulse detection unit 16 detects whether the vehicle is moving or not. The parking brake detection unit 17 is intended to receive a parking brake release output of the vehicle. The control unit 6a can detect the vehicle driving state by receiving vehicle driving state detection signals from these units.

In the above configuration, a non-contact charging operation is described with reference to the process flow shown in FIG. 3. As shown in FIG. 2, when the mobile device 13 is charged in the vehicle interior 2 by the in-vehicle charger 6, a user approaches the charging coil 12 and the charging coil 14 and operates a charging start switch 6b (51 in FIG. 3).

Figure 3:
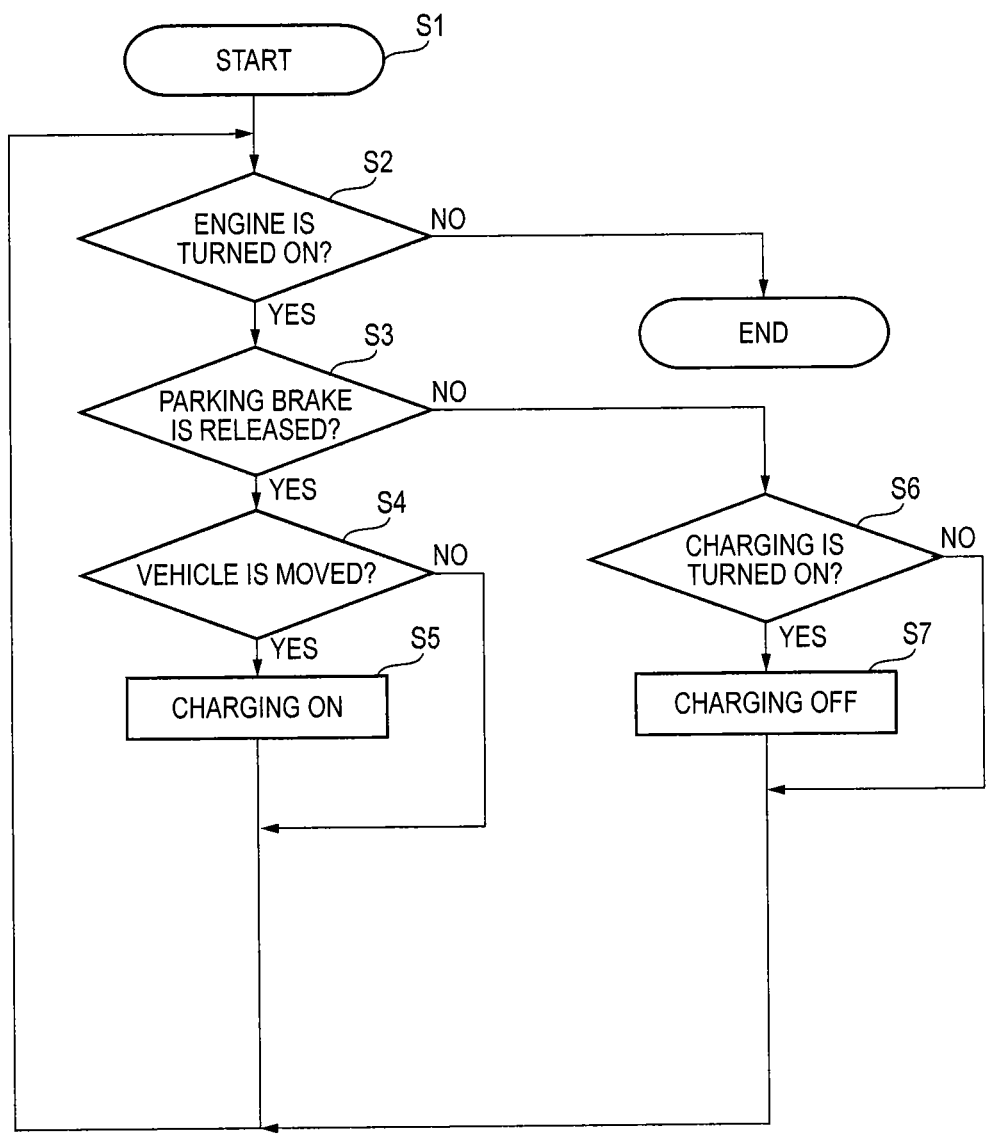
FIG. 3 is a flowchart showing an operation of the in-vehicle charger.

Then, the control unit 6a of the in-vehicle charger 6 first detects an engine operation state via the engine operation detection unit 15 (S2 in FIG. 3).

At this time, when the engine is not operated, the control unit 6a does not start to charge the mobile device 13 in order to prevent the battery consumption of the vehicle or the interference with the opening/closing operation of the door.

That is, in a state where the engine is not operated, now, boarding into the vehicle interior 2 or the like is performed. That is, there is a possibility that communication between the wireless key 8 and the antennas 9 and communication between the wireless key 8 and the antenna 10 are performed in order to open/close the door.

Therefore, in this case, the control unit 6a does not cause magnetic flux to be emitted from the charging coil 12. In addition, it is preferred that power is not supplied to the charging circuit 6c. In this way, the opening/closing operation of the door is not affected. The reason is that supply of power to the charging circuit 6c may affect the opening/closing operation of the door.

Further, when the control unit 6a determines that the engine is in a state of being operated, subsequently, then, the parking brake detection unit 17 detects whether the parking brake is pulled or not (S3 in FIG. 3).

That is, when an occupant exits from a vehicle and returns to the vehicle again even after the engine is driven, communication between the wireless key 8 and the antennas 9 and communication between the wireless key 8 and the antenna 10 are performed in order to open/close the door in a state where the engine is still driven. Accordingly, at this time, it is intended not to hinder the opening/closing operation of the door.

Specifically, when the parking brake is in a pulled state, the control unit 6a causes the in-vehicle charger 6 to be turned off even when the in-vehicle charger 6 is in an on state (S6, S7 in FIG. 3).

Further, when the parking brake is in a non-pulled state, then, the control unit 6a determines whether the vehicle is moving or not, on the basis of the signal from the speed pulse detection unit 16 (S4 in FIG. 3).

And, when the control unit 6a determines that the vehicle is moving, based on the signal from the speed pulse detection unit 16, the control unit 6a starts to supply power to the charging circuit 6c and therefore causes the in-vehicle charger 6 to be turned on for the first time (S5 in FIG. 3).

Meanwhile, when the parking brake is in the non-pulled state, the control unit 6a determines that the vehicle is in a driving state. And, the control unit 6a may instruct the charging circuit 6c to supply power and cause the in-vehicle charger 6 to be turned on.

However, when the control unit 6a determines that the vehicle is not moving, based on the signal from the speed pulse detection unit 16, there is a possibility that the parking brake is pulled. Accordingly, at this time, it is preferred that the in-vehicle charger 6 is not turned on.

As described above, the in-vehicle charger of the present embodiment includes the charging coil and the control unit connected to the charging coil and has a configuration that the control unit supplies power to the charging coil at the time of detecting a vehicle driving state. Accordingly, it is possible to prevent a decrease in the reliability of the vehicle control.

That is, in the present embodiment, power is supplied to the charging coil in accordance with, for example, the detection of the engine operation state of the vehicle and whether the parking brake is pulled or not, at the time of detecting the vehicle driving state. Accordingly, in a state before driving the vehicle, that is, in a state where the door is opened/closed and boarding or exiting is performed, power is not supplied to the charging coil.

Accordingly, even when wireless communication between the remote control key and the transceiver of the vehicle is performed in order to open/close the door, for example, the electromagnetic waves emitted from the charging coil do not affect the wireless communication. As a result, it is possible to prevent a decrease in the reliability of the open/close control of the door, etc., for example.

Although the present invention has been described in detail with reference to particular illustrative embodiments, the present invention is not limited to the illustrative embodiments and it is obvious to those skilled in the art that the illustrative embodiments can be variously modified without departing the spirit and scope of the present invention.

This application is based upon Japanese Patent Application No. 2011-048701 filed on Mar. 7, 2011, and the contents of which are incorporated herein by reference.

In the present embodiment described above, power is supplied to the charging coil in accordance with, for example, the detection of the engine operation state of the vehicle. Accordingly, in a state before driving the vehicle, that is, in a state where the door is opened/closed and boarding or exiting is performed, power is not supplied to the charging coil.

Accordingly, even when wireless communication between the remote control key and the transceiver of the vehicle is performed in order to open/close the door, for example, the electromagnetic waves emitted from the charging coil do not affect the wireless communication. As a result, it is possible to prevent a decrease in the reliability of the open/close control of the door, etc., for example.

Accordingly, the present invention is expected to be utilized as the in-vehicle charger.

DESCRIPTION OF REFERENCE NUMERALS AND SIGNS 1 vehicle body
2 vehicle interior 3 steering wheel
4 front seats
5 rear seats
6 in-vehicle charger
6a control unit
6b charging start switch
6c charging circuit
7 vehicle control device
8 wireless key
9, 10 antenna
11 RF circuit
12 charging coil
13 mobile device
14 charging coil
15 engine operation detection unit
16 speed pulse detection unit
17 parking brake detection unit

The invention claimed is:

1. A method for operating an in-vehicle charger, the in-vehicle charger including a charging coil for performing non-contact charging to a mobile device placed in a vehicle to which the in-vehicle charger is mounted, comprising:
   a step of detecting, in the in-vehicle charger, a first signal indicating the engine is driven;
   a step of detecting, in the in-vehicle charger, a second signal indicating a state of a vehicle component of the vehicle other than the engine; and
   a step of instructing a start or stop of supplying power to the charging coil in response to detecting both of the first signal and the second signal,
      wherein the second signal is at least one of a brake release signal of the vehicle and a speed pulse signal from a speed pulse detection unit.

2. The method according to claim 1, wherein the start of supplying power to the charging coil is instructed in response to detecting both that the engine is driven and the brake is released.

3. The method according to claim 1, wherein the start of supplying power to the charging coil is instructed in response to detecting both that the engine is driven and the vehicle is moving.

4. The method according to claim 1, wherein the start of supplying power to the charging coil is instructed in response to detecting that the engine is driven, the brake is released, and the vehicle is moving.

5. The method according to claim 1, wherein the stop of supplying power to the charging coil is instructed in response to detecting both that the engine is driven and the brake is not released.

6. The method according to claim 1, wherein in the step of instructing the start or stop of supplying of power to the charging coil, determining whether or not the vehicle is in a state where communication between a communication device in the vehicle and a wireless key may possibly be performed based on the first signal and the second signal.

7. An in-vehicle charger mounted to a vehicle comprising:
   a charging coil for performing non-contact charging to a mobile device placed in the vehicle; and
   a control unit connected to a charging coil,
   wherein the control unit instructs a start or stop of supplying power to the charging coil in response to detecting a first signal indicating the engine is driven and a second signal indicating a state of a vehicle component of the vehicle other than the engine, and
   wherein the second signal is at least one of a brake release signal of the vehicle and a speed pulse signal from a speed pulse detection unit.

8. The in-vehicle charger according to claim 7, wherein the control unit instructs the start of supplying power to the charging coil in response to detecting both that the engine is driven and the brake is released.

9. The in-vehicle charger according to claim 7, wherein the control unit instructs the start of supplying power to the charging coil in response to detecting both that the engine is driven and the vehicle is moving.

10. The in-vehicle charger according to claim 7, wherein the control unit instructs the start of supplying power to the charging coil in response to detecting that the engine is driven, the brake is released, and the vehicle is moving.

11. The in-vehicle charger according to claim 7, wherein the control unit instructs the stop of supplying power to the charging coil in response to detecting both that the engine is driven and the brake is not released.

12. The in-vehicle charger according to claim 7, wherein the control unit determines whether or not the vehicle is in a state where communication between a communication device in the vehicle and a wireless key may possibly be performed based on the first signal and the second signal, and instructs the start or stop of supplying power to the charging coil in response to the determination.

* * * * *